United States Patent [19]

Koch

[11] Patent Number: 4,866,163
[45] Date of Patent: Sep. 12, 1989

[54] DISAZO COMPOUNDS HAVING TWO 4,8 DISULFONAPHTHYL-2 DIAZO COMPONENT RADICALS AND TWO TRIAZINE 1,3,5 TRIAZINE RINGS LINKED BY A PIPERAZINYLENE RADICAL

[75] Inventor: Werner Koch, Oberwil, Switzerland
[73] Assignee: Sandoz, Ltd., Basel, Switzerland
[21] Appl. No.: 606,341
[22] Filed: May 2, 1984

Related U.S. Application Data

[63] Continuation of Ser. No. 448,679, Dec. 10, 1982, abandoned.

[30] Foreign Application Priority Data

Dec. 11, 1981 [DE] Fed. Rep. of Germany ....... 3149140

[51] Int. Cl.⁴ .................. C09B 62/09; C09B 43/04; D06P 1/382; D06P 3/10
[52] U.S. Cl. .................... 534/634; 534/583; 534/598; 534/617; 534/637; 534/638; 534/728; 534/797
[58] Field of Search ............... 260/153; 534/634, 797, 534/728, 637, 617

[56] References Cited

U.S. PATENT DOCUMENTS

| | | | |
|---|---|---|---|
| 2,459,435 | 1/1949 | Keller et al. | 260/153 |
| 3,398,133 | 8/1968 | Barben et al. | 260/153 |
| 3,647,778 | 3/1972 | Andrew et al. | 260/153 |
| 3,658,782 | 4/1972 | Griffiths et al. | 260/153 |
| 3,966,705 | 6/1976 | Oesterlein et al. | 260/153 |
| 4,228,071 | 10/1980 | Riat et al. | 260/153 |

FOREIGN PATENT DOCUMENTS

| | | |
|---|---|---|
| 2611550 | 9/1976 | Fed. Rep. of Germany ...... 260/153 |
| 3043915 | 6/1981 | Fed. Rep. of Germany ...... 260/153 |
| 678655 | 12/1964 | Italy ................... 260/153 |
| 50-107277 | 8/1975 | Japan ................. 260/153 |
| 51-26386 | 3/1976 | Japan ................. 260/153 |
| 51-127124 | 11/1976 | Japan ................. 260/153 |
| 51-127280 | 11/1976 | Japan ................. 260/153 |
| 51-147688 | 12/1976 | Japan ................. 260/153 |
| 52-85585 | 7/1977 | Japan ................. 260/153 |
| 774925 | 5/1957 | United Kingdom ........ 260/153 |
| 854432 | 11/1960 | United Kingdom ........ 260/153 |
| 1260582 | 1/1972 | United Kingdom ........ 260/153 |
| 1461125 | 1/1977 | United Kingdom ........ 260/153 |
| 1527949 | 10/1978 | United Kingdom ........ 260/153 |
| 2070006 | 9/1981 | United Kingdom ........ 260/153 |
| 2084597 | 4/1982 | United Kingdom ........ 260/153 |

Primary Examiner—Floyd D. Higel
Attorney, Agent, or Firm—Gerald D. Sharkin; Richard E. Vila; Melvyn M. Kassenoff

[57] ABSTRACT

Compounds of the formula

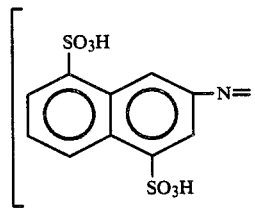

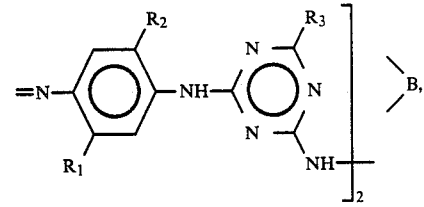

wherein each $R_1$ is independently hydrogen, halo, $C_{1-4}$alkyl, $C_{1-4}$alkoxy or —NHCOC$_{1-4}$alkyl, each $R_2$ is H, halo, $C_{1-4}$alkyl or $C_{1-4}$alkoxy, each $R_3$ is independently halo, hydroxy, $C_{1-4}$alkoxy, —NHOH, amino or an aliphatic, aromatic cycloaliphatic or saturated heterocyclic amino radical, and is divalent aliphatic or aromatic group or, together with the NH radicals to which it is attached, forms a piperazine ring, and the use thereof for dyeing or printing hydroxy group- or nitrogen-containing organic substrates after which the dyed or printed substrate is optionally treated with a cationic fixing agent.

11 Claims, No Drawings

DISAZO COMPOUNDS HAVING TWO 4,8 DISULFONAPHTHYL-2 DIAZO COMPONENT RADICALS AND TWO TRIAZINE 1,3,5 TRIAZINE RINGS LINKED BY A PIPERAZINYLENE RADICAL

This application is a continuation of Ser. No. 06/448,679 filed Dec. 10, 1982 and now abandoned.

This invention relates to a process for dyeing or printing hydroxy group- or nitrogen-containing organic substrates employing disazo direct dyes and after-treating the dyed or printed substrate with a cationic fixing agent; furthermore, it relates to the novel disazo compounds employed therein and to a process for their production.

The present invention provides a process for dyeing or printing hydroxy group- or nitrogen-containing organic substrates employing a compound which, in free acid form, corresponds to formula I,

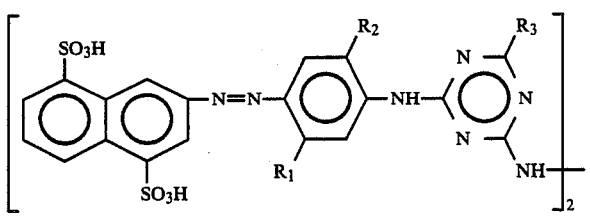 

in which
each $R_1$, independently, is hydrogen, halogen, $C_{1-4}$alkyl, $C_{1-4}$alkoxy or —NHCOC$_{1-4}$alkyl,
each $R_2$, independently, is hydrogen, halogen, $C_{1-4}$alkyl or $C_{1-4}$alkoxy,
each $R_3$, independently, is halogen, OH, $C_{1-4}$alkoxy, —NHOH, NH$_2$, an aliphatic, aromatic or cycloaliphatic amine radical or a saturated heterocyclic amine radical in which the nitrogen atom is part of the heterocycle which optionally contains further hetero atoms, and
B is a divalent aliphatic or aromatic radical, with the proviso that each aromatic C$_6$ ring is bound in the 1,4-positions, or
B, together with the NH-radicals to which it is bound, forms a piperazine ring,
or a mixture of compounds of formula I, which compounds are in free acid or salt form, and after-treating the dyed or printed substrate with a fixing agent comprising a precondensate or mixture of
either (A) the product of reacting a mono- or polyfunctional primary or secondary amine with cyanamide, dicyandiamide, guanidine or biguanide; or ammonia with cyanamide or dicyandiamide, said product (A) containing reactive hydrogen atoms bound to nitrogen, or (B) a quaternary polyalkylene polyamine with (C) an N-methylol derivative of a urea, melamine, guanamine, triazinone, urone, carbamate or acid amide,
optionally together
with (D) a catalyst for the crosslinking of N-methylol compounds of the type (C) above.

Details concerning the fixing agent as a combination of (A), (C) and (D) and its use are described in British Patent Publication No. 2 070 006 A; details concerning the combination (B), (C) and (D) are described in British Patent Publication No. 2 084 597 A. Thus, the entire subject matter disclosed on pages 1 to 6 of the British published Patent Application No. 2 070 006 and likewise that disclosed on pages 1 to 5 and 7 of the British published Patent Application No. 2 084 597 are hereby incorporated by reference.

Dyeing and printing may be carried out in accordance with known methods.

Preferred compounds of formula I to be employed are those in which B is an aromatic bridging member linked through the 1,4-positions of the aromatic C$_6$-ring(s), which bridging member is free from sulphonic acid groups, or B, together with the NH-radicals to which it is bound, forms a piperazine ring.

It is also preferred to employ a mixture of compounds of formula I in which the radicals $R_3$ being halogen are partially substituted by one of the radicals $R_3$ other than halogen. These mixtures of compounds of formula I may be prepared by reacting an equivalent of a compound of formula I, wherein $R_3$ is halogen, with 0.01 to 1.5 equivalents of a base, ammonia, an alcohol or, particularly, an amine. Thus, by graduating the incomplete exchange of halogen for another radical $R_3$, it is possible to obtain different mixtures of compounds of formula I varying in water solubility depending on the affinity for a certain substrate used.

Further preferred is the use of a compound which, in the free acid form, corresponds to formula Ia,

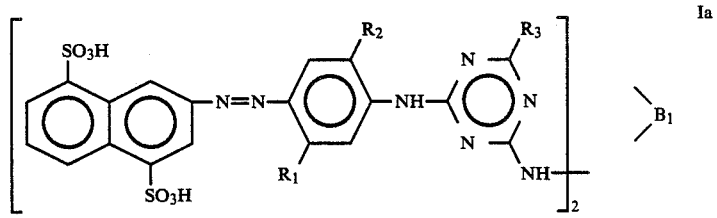

wherein $R_1$, $R_2$ and $R_3$ are as defined above, and $B_1$ is

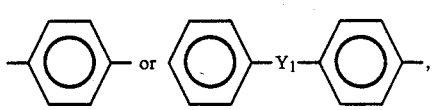

where $Y_1$ is —CO—, —NHCO—, —NHCONH—, —(CH$_2$)$_{1-4}$—, —NH—, —N=N—, —NHCOCONH—, —NHCOCH=CHCONH—, —OCH$_2$CH$_2$O—, —NHCOCH$_2$CH$_2$CONH— or

or $B_1$, together with the NH-radicals to which it is bound, forms a piperazine ring.

Furthermore, the present invention provides the novel compounds of formula Ia and mixtures thereof, which compounds are in free acid or salt form, with the proviso that when both radicals $R_1$ are identical and are methyl or —NHCOCH$_3$, each $R_2$ is hydrogen and $B_1$ is 1,4-phenylene, at least one of the radicals $R_3$ is other than chlorine.

Any halogen is preferably fluorine, chlorine or bromine, more preferably it is fluorine or chlorine, especially chlorine.

In compounds of formula Ia the radicals $R_1$ and $R_2$, respectively, may be the same or different; preferably, they are identical.

Any alkyl as $R_1$ and $R_2$, independently, is preferably $C_{1-2}$alkyl, more preferably methyl; any alkoxy, independently, is preferably methoxy or ethoxy, especially methoxy.

Where $R_1$ is a —NHCOalkyl group, it preferably contains a $C_{1-2}$alkyl group; especially, $R_1$ is —NHCOCH$_3$.

$R_1$ is preferably $R_{1a}$, where $R_{1a}$ is hydrogen, chlorine, $C_{1-2}$alkyl, $C_{1-2}$alkoxy or —NHCOC$_{1-2}$alkyl; more preferably, $R_1$ is $R_{1b}$, where $R_{1b}$ is hydrogen, methyl, methoxy or —NHCOCH$_3$; even more preferably, $R_1$ is $R_{1c}$, where $R_{1c}$ is hydrogen, methoxy or —NHCOCH$_3$; most preferably, $R_1$ is —NHCOCH$_3$.

$R_2$ is preferably $R_{2a}$, where $R_{2a}$ is hydrogen, $C_{1-2}$alkyl or $C_{1-2}$alkoxy; more preferably, $R_2$ is $R_{2b}$, where $R_{2b}$ is hydrogen, methyl or methoxy; most preferably, $R_2$ is hydrogen.

Any alkoxy as $R_3$ is preferably methoxy.

When $R_3$ is an aliphatic amino group it is preferably a monoalkyl- or dialkyl-amino group in which the alkyl group contains 1 to 4 carbon atoms and is straight chain or branched and is optionally substituted by —NH$_2$ or by one or two hydroxy groups.

Any aromatic amine radical as $R_3$ is preferably phenylamino in which the phenyl ring is optionally substituted by 1 or 2 substituents selected from halogen, $C_{1-4}$alkyl, $C_{1-4}$alkoxy and —NHCOC$_{1-4}$alkyl.

Any cycloaliphatic amine radical is preferably a $C_{5-6}$-cycloalkylamino group, especially a cyclohexylamino group.

Any heterocyclic amine radical is preferably a morpholine, piperidine, piperazine or pyrrolidine group.

$R_3$ is preferably $R_{3a}$, where $R_{3a}$ is fluorine, chlorine, —OH, OCH$_3$, —NH$_2$, —NHOH, C$_{1-4}$alkylamino, C$_{2-4}$hydroxyalkylamino, N—C$_{1-4}$—alkyl—N—C$_{2-4}$hydroxyalkylamino, bis(C$_{2-4}$hydroxyalkyl)amino, C$_{3-4}$dihydroxyalkylamino, C$_{2-4}$aminoalkylamino; phenylamino in which the phenyl ring is optionally substituted by 1 or 2 substituents selected from chlorine, methyl, methoxy and —NHCOCH$_3$; or morpholino; more preferably, $R_3$ is $R_{3b}$, where $R_{3b}$ is fluorine, chlorine, NH$_2$, C$_{1-2}$alkylamino, C$_{2-4}$hydroxyalkylamino, N—C$_{1-2}$alkyl—N—C$_{2-4}$hydroxyalkylamino, bis(C$_{3-4}$hydroxyalkyl)amino, C$_{2-4}$dihydroxyalkylamino, C$_{2-4}$aminoalkylamino, acetamidophenylamino or morpholino; more preferably, $R_3$ is $R_{3c}$, where $R_{3c}$ is chlorine, C$_{2-4}$hydroxyalkylamino, bis(C$_{2-4}$hydroxyalkyl)amino or C$_{3-4}$dihydroxyalkylamino; even more preferably, $R_3$ is $R_{3d}$, where $R_{3d}$ is chlorine, 2-hydroxyethylamino, C$_{3-4}$dihydroxyalkylamino or bis(2-hydroxyethyl)amino; most preferably, $R_3$ is $R_{3e}$, where $R_{3e}$ is chlorine or 2,3-dihydroxypropylamino; especially, $R_3$ is chlorine.

In $R_{3a}$ to $R_{3d}$ any hydroxy or amino substituent on an alkyl group is in other than the 1-position and when an alkyl group contains two hydroxy substituents, they are on different carbon atoms and the alkyl moiety contains 3 or 4 carbon atoms.

In the bridging member $B_1$ as divalent group

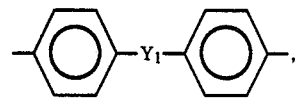

$Y_1$ is preferably $Y_{1a}$, where $Y_{1a}$ is —NHCO—, —NHCONH— or —(CH$_2$)$_{1-4}$—; especially, $Y_1$ is —NHCONH—.

$B_1$ is preferably $B_{1a}$, where $B_{1a}$ is 1,4-phenylene,

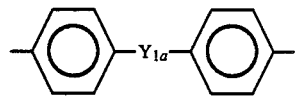

or, together with the NH$^-$ radicals to which it is bound, forms a piperazine ring; more preferably, $B_1$ is $B_{1b}$, where $B_{1b}$ is 1,4-phenylene,

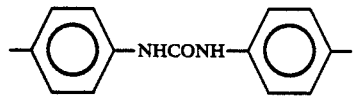

or, together with the NH$^-$ radicals to which it is bound, forms a piperazine ring; even more preferably, $B_1$ is $B_{1c}$, where $B_{1c}$ is 1,4-phenylene or, together with the NH$^-$ radicals to which it is bound, forms a piperazine ring; most preferably, $B_1$ together with the NH$^-$ radicals forms a piperazine ring.

Preferred compounds of formula Ia are those which, in free acid form, correspond to formula Ib,

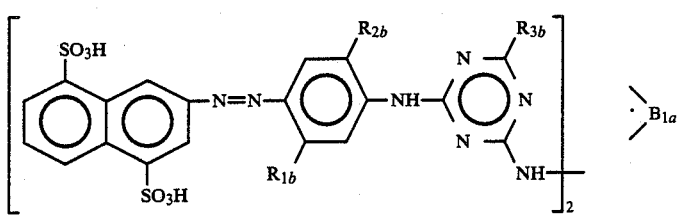 

wherein $R_{1b}$, $R_{2b}$, $R_{3b}$ and $B_1$ are as defined above; and wherein the radicals $R_{1b}$ and $R_{2b}$, respectively, are identical and the radicals $R_{3b}$ may be the same or different; for the compounds of formula Ib the same provisos as for the compounds of formula Ia are pertinent.

Further preferred compounds of formula Ib are those wherein (1) the radicals $R_{3b}$, independently, are $R_{3c}$;
(2) those of (1), wherein the radicals $R_{3b}$, independently, are $R_{3d}$;
(3) those of (1) or (2), wherein $B_{1a}$ is $B_{1b}$;
(4) those of (1) or (2), wherein $B_{1a}$ is $B_{1c}$;
(5) those of (1) or (2), wherein $B_{1a}$, together with the $NH^-$ radicals to which it is bound, forms a piperazine ring;
(6) those of (5), wherein $R_{1b}$ is —$NHCOCH_3$ and $R_{2b}$ is hydrogen;
(7) those of (6), wherein the radicals $R_{3b}$, independently, are $R_{3e}$;
(8) a compound according to (7), wherein each $R_{3b}$ is chlorine.

When the compounds of formula I, Ia or Ib are in the salt form, the cation of sulpho groups is not critical and may be any of those non-chromophoric cations conventional in the field of anionic direct dyestuffs. Examples of such cations are alkali metal cations and unsubstituted and substituted ammonium cations e.g., lithium, sodium, potassium, ammonium, mono-, di- tri- and tetra-methylammonium, triethylammonium and mono-, di- and tri-ethanolammonium.

The preferred cations are the alkali metal cations and ammonium, with sodium being the most preferred.

In a compound of formula I, Ia or Ib when in salt form, the cations of the sulpho groups present may be the same or different and are preferably the same. Likewise, the compounds also may be in a mixed free acid/salt form, where some of the sulpho groups are in free acid and some are in salt form.

The present invention further provides a process for the preparation of compounds of formulae Ia and I, respectively, comprising reacting a compound which, in free acid form, corresponds to formula II,

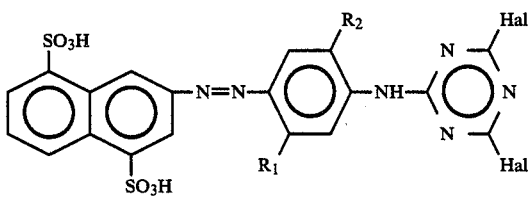

wherein Hal is halogen,
with a diamine of formula IIIa and III, respectively,

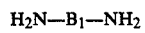    IIIa

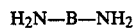    III and optionally subsequently totally or partially replacing the halogen atom of each triazine radical by reacting with the corresponding amount of a base or a compound $R_{3x}H$, wherein $R_{3x}$ has one of the significances of $R_3$ with the exception of OH and halogen.

The reaction of a compound of formula II with a compound of formula IIIa or III, respectively, is carried out in accordance with known methods. Preferably, the reaction is carried out at temperatures from 10° to 50° C.

The replacement of the halogen atom by another group $R_3$ may be effected in accordance with conventional methods, preferably at pH 7 to 10 and at temperatures from 70° to 100° C. To prepare mixtures of compounds of formula I with respect to the radicals $R_3$, for example one equivalent of a compound of formula I is reacted with 0.01 to 1.5 equivalents of an amine, a base, an alcohol or ammonia.

The compounds of formulae Ia and I, respectively, may be isolated in accordance with known methods, for example by salting out with a small amount of an alkali metal salt, filtering and drying in vacuo.

The starting materials of formula II are either known or may be prepared in conventional manner by reacting the corresponding amino-monazo compound with cyanuric halide.

The diamines of formula III and also the compounds $R_{3x}H$ are either known or may be prepared in accordance with known methods from available starting materials.

The compounds of formula Ia and mixtures thereof which are preferably in salt form are useful for dyeing or printing hydroxy group- or nitrogen-containing organic substrates. Preferred substrates are paper, leather and textiles comprising or consisting of cellulose fibres, such as cotton.

The compounds according to the invention show high affinity for the substrate and therefore are good direct dyes. Dyeing and printing with the dyes of the invention may be carried out in accordance with known methods. Dyeing of natural regenerated cellulose such as cotton is preferably carried out according to the conventional exhaust dyeing method using temperatures from 40° to 100° C. Further suitable is the continuous dyeing method and thus processes such as cold pad-batch, pad-steam, pad-roll or pad-dry may be applied.

The dyestuffs of the invention give deep dyeings and show high exhaustion yields. Furthermore, they are not adversely affected by electrolytes. The dyestuffs are also suitable for dyeing in combination with analogous dyes showing similar dyeing properties.

Dyeings and prints on the above-mentioned substrates exhibit good wet fastnesses (such as fastness to washing or sweat) and good light fastness. Furthermore, they show good fastness to peroxide, perborate and chlorine.

The wet-fastness properties of the direct dyestuffs on cellulose fibres containing textile material may be notably improved by the initially mentioned special resin after-treatment with selected auxiliaries. Particularly, this treatment gives improved wash-fastness properties, allowing repeated washing at high temperatures.

The following examples further serve to illustrate the invention. In the examples all parts and percentages are by weight or volume and all temperatures are in degrees Centigrade.

PREPARATION EXAMPLES

Example 1

91 Parts 2-aminonaphthalene-4,8-disulphonic acid 100% (=0.3 moles) are dissolved in water of 50° by adding a small amount of sodium hydroxide and whilst stirring. To this solution (40°; pH 9-10) 80 parts 4N sodium nitrite solution are added with the temperature being kept just over 30°. This reaction solution is added dropwise to a mixture consisting of 90 parts 30% hydrochloric acid and 60 parts ice within 20-30 minutes, whilst stirring. During the addition, the temperature is held at 15°-20° by further addition of 150 parts ice. After 1 hour the excess nitrous acid is decomposed by adding a small quantity of amidosulphonic acid.

Coupling is effected by adding the thus prepared diazo suspension dropwise within 40-50 minutes to 112.5 parts 3-aminoacetanilide (ca. 40%) which were dissolved in 150 parts water of 30°-35° by the addition of 85 parts 20% sodium carbonate solution at pH 6.5-7.0 and subsequent addition of 100 parts ice. While adding, the temperature is kept between −2° and 1° by the portionwise addition of further 500 parts ice and the pH is maintained at 6.6-7.0 by simultaneously adding 160 parts of 20% sodium carbonate solution. At the end of the diazo addition the thus obtained dyestuff precipitates. After 2 hours further stirring coupling is completed.

To the thus prepared amino-monoazo dye suspension 52.5 parts cyanuric chloride are added at 7°-12° whilst stirring vigorously. The pH is kept at 6.5-7.0 by adding dropwise 80 parts of 20% sodium carbonate solution. While reacting, the temperature rises to room temperature. At the end of the condensation further 1-2 parts cyanuric chloride are added. Subsequently, the reaction mixture is heated to 30°-33° over a period of about 30 minutes. The whole condensation is completed within about 3 hours.

To this condensation reaction mixture 12.2 parts piperazine dissolved in 100 parts water are added with stirring over a period of 10-20 minutes, while keeping the pH at 7.0 to 7.5 by the addition of 100 parts 20% sodium carbonate solution. After about 20 minutes the reaction is finished; in order to complete the reaction, stirring is effected at ca. 50° for a further 1 to 1.5 hour. Then, 125 parts sodium chloride are added within 30 minutes. The mixture is stirred overnight; subsequently, the orange dyestuff which precipitates is filtered off and dried in vacuo at 70°-80°. The thus obtained dyestuff which, in free acid form, corresponds to the formula

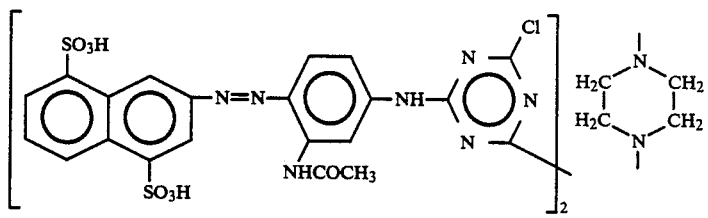

gives dyeings on cotton of a yellow shade.

Example 2

In accordance with the method described in Example 1 the condensation product of amino-monoazo dyestuff and cyanuric chloride is prepared starting with 0.5 instead of 0.3 moles 2-aminonaphthalene-4,8-disulphonic acid and using the corresponding increased amounts for the other reactants.

To the above obtained solution which is clear-filtered, 15.1 parts p-phenylenediamine, dissolved in a small amount of ethanol, are added at 12° and pH 2. During the reaction the pH is kept at 7 by adding 20% sodium carbonate solution. The temperature is raised gradually to 30°. After 8 hours the reaction is complete. By adding a small amount of ethanol and sodium chloride, the cold reaction mixture may be filtered smoothly and the product is isolated and dried. The dyestuff thus obtained which, in the free acid form, corresponds to formula

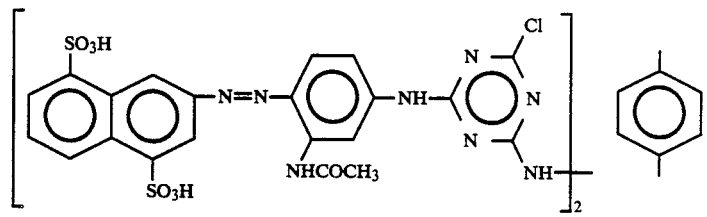

dyes cotton in a yellow shade.

Example 3

18.9 Parts of the dyestuff obtained according to the method described in Example 2 (100%) are suspended in 450 parts water. To this suspension a ca. ten-fold excess (=10 parts) of monoethanolamine is added. The mixture is refluxed for 4 to 5 hours; the end of the reaction may be ascertained by thin layer chromatography. After cooling to room temperature, the alkaline reaction mixture is neutralized to pH 7 by adding a small amount of hydrochloric acid. The reaction product is salted out with a small amount of sodium chloride, filtered and dried. The dyestuff which, in free acid form, corresponds to the formula

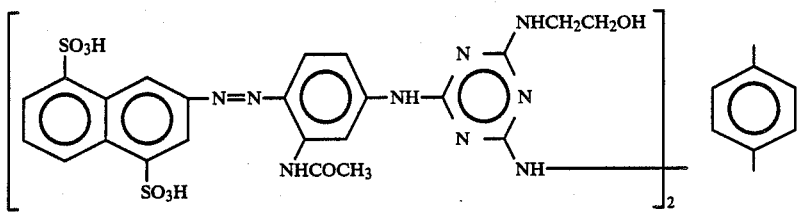

is obtained; it gives dyeings on cotton of a yellow shade.

Example 4

According to the method described in Example 3 but using a molar deficit (0.5 parts) of monoethanolamine instead of the ten-fold excess for the reaction with 18.9 parts of the dyestuff of Example 2, a mixture of dyes is obtained containing the dyestuffs of Examples 2 and 3 and additionally, the dyestuff which, in the free acid form, corresponds to formula,

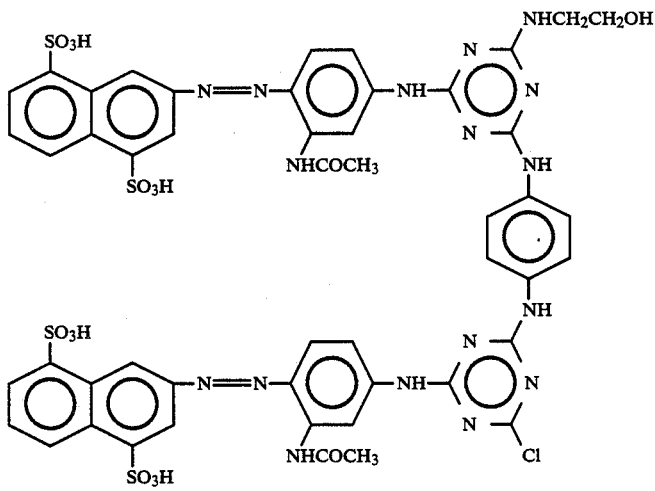

thus representing a direct dye mixture well suitable for dyeing of cotton resulting in a yellow shade.

APPLICATION EXAMPLES

Application Example A 0.5 Parts of the dye of Example 4 are dissolved in 200 parts water at 60°. 10 Parts cotton fabric, 16 parts Glauber's salt and 4 parts sodium carbonate are subsequently added to the dyebath. The bath is raised to 98° over 45 minutes.

Dyeing is continued for 1 hour at 98°. During dyeing, the water that evaporates is continuously replaced. The dyed fabric is then removed from the liquor, rinsed with cold and hot water, soaped at the boil for 20 minutes in 500 parts water and 0.5 parts sodium alkylsulphonate, rinsed again and dried. A yellow dyeing having good light and wet fastnesses is obtained.

Application Example B 0.5 Parts of the dyes of Example 1, 2 or 3 of the dye mixture according to Example 4, respectively, are dissolved in 200 parts demineralized water. 10 Parts cotton cretonne (bleached) are added to the dyebath at 50°–60° and the bath is raised to 98° within 30 minutes. Then 1 part and after 10 minutes further 2 parts calcinated Glauber's salt are added maintaining the temperature at 98° for a further 35 minutes. Subsequently, it is cooled to 80° within 15 minutes. During the dyeing procedure, the water that evaporates is replaced with demineralized water of 98°. The dyed fabric is rinsed with running cold water for 5 minutes, centrifuged and dried at 80°. A yellow dyeing (for all dyes employed) with good light- and wet-fastness properties is obtained.

Application Example C

A cotton fabric dyed with a 1/1 standard depth dyeing of the dye of Example 1, 2 or 3 or of the dye mixture according to Example 4, respectively, is padded with an aqueous solution containing 100 g/l of a fixing agent which is a mixture given below and squeezed out to give a pick-up of about 80%. The fabric is then shock-dried on a tension frame at 175°–180° in such a way that the cross-linking time of the dry fabric is 30–45 seconds at this temperature.

The fixing agent is a reaction product (at 70° for 3 hours) of (A) 68.5 parts of a spray-dried solution at pH 7.5 which was obtained by condensation of 103 parts diethylene triamine with 84 parts dicyandiamide at 110° (→160°) and subsequent stepwise neutralisation with 44.6% sulphuric acid with the addition of ice, and (C) 457 parts of a 50% solution of dimethyloldihydroxyethylene urea heated to 70°, to which 23 parts dicyandiamide as stabilizing agent are added. This product may be used as such or together with a catalyst for the cross-linking, e.g. magnesium chloride.

The obtained yellow cotton dyeing fixed in such a way exhibits excellent wash-fastness and withstands repeated 60° washes and even a wash at the boil. At the same time a clear improvement of crease resistance is obtained, and the swelling value of the cellulose fibres is reduced.

Application Example D

Instead of the fixing agent used in Application Example C it is also possible to employ the water-soluble precondensate which is obtained by reacting (B) 100 parts of a 50% aqueous solution of the reaction product of epichlorohydrin and dimethylamine with (C) 150 parts of a 50% aqueous solution of dimethyloldihydroxyethylene urea in the presence of (D) 20 parts magnesium chloride.hexahydrate at 70° for 30 minutes.

The resulted yellow cotton dyeing after-treated in such a way shows excellent wash-fastness. At the same time a clear improvement of crease resistance is obtained, and the swelling value of the cellulose fibres is reduced.

Examples 5–33

According to the method described in Examples 1–3 further dyestuffs may be prepared which may be used according to the invention. These dyes, in free acid form, correspond to the formula

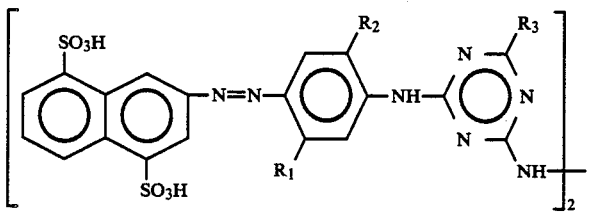

and are listed in the following Table 1. They dye cotton in a yellow shade, the dyeings obtained may be after-treated according to the method described in Application Examples C and D yielding in dyeings with notably improved wet-fastnesses.

TABLE 1

| Ex. No. | $R_1$ | $R_2$ | $R_3$ |
|---|---|---|---|
| 5 | $CH_3$ | H | $-NHCH_2CH_2OH$ |
| 6 | " | $CH_3$ | " |
| 7 | " | $OCH_3$ | " |
| 8 | H | " | " |

TABLE 1-continued

| Ex. No. | $R_1$ | $R_2$ | $R_3$ |
|---|---|---|---|
| 9 | $CH_3$ | H | $-NH-$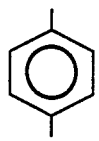$-NHCOCH_3$ |
| 10 | $NHCOCH_3$ | H | " |
| 11 | H | H | Cl |
| 12 | $CH_3$ | $OCH_3$ | Cl |
| 13 | " | " | $-N(CH_2CH_2OH)_2$ |
| 14 | " | H | $NH_2$ |
| 15 | " | $OCH_3$ | F |
| 16 | " | H | OH |
| 17 | $NHCOCH_3$ | H | OH |
| 18 | " | H | $NH_2$ |
| 19 | " | H | $-NHCH_2CHCH_2OH$<br>$\quad\quad\quad\quad\quad\,\,\,\,|$<br>$\quad\quad\quad\quad\quad\,\,\,OH$ |
| 20 | " | H | F |
| 21 | $CH_3$ | H | $-NHCH_2CHCH_2OH$<br>$\quad\quad\quad\quad\quad\,\,\,\,|$<br>$\quad\quad\quad\quad\quad\,\,\,OH$ |
| 22 | " | H | $-N(CH_2CH_2OH)_2$ |
| 23 | $NHCOCH_3$ | H | " |
| 24 | $OCH_3$ | $OCH_3$ | Cl |
| 25 | H | " | Cl |
| 26 | $CH_3$ | H | $-NHCH_3$ |
| 27 | $NHCOCH_3$ | H | " |
| 28 | " | H | $-NHCH_2CH_2NH_2$ |
| 29 | " | H | $-NHCH_2CHNH_2$<br>$\quad\quad\quad\quad\quad\,\,\,|$<br>$\quad\quad\quad\quad\quad\,CH_3$ |
| 30 | $CH_3$ | H | " |
| 31 | " | H | $-NHCH_2CH_2NH_2$ |
| 32 | " | H | $-NHCH(CH_2OH)_2$ |
| 33 | $NHCOCH_3$ | H | " |

Examples 34–48 and 49–75

Further dyestuffs applicable according to the invention may be prepared in accordance with the method described in Examples 1–3. They correspond, in free acid form, to the formulae

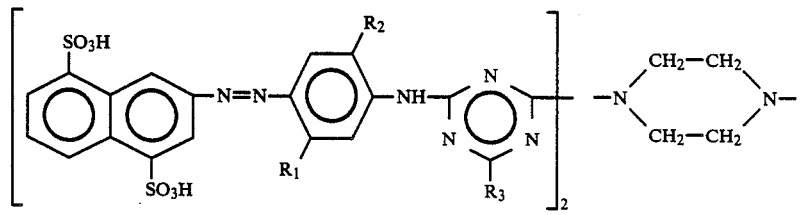

(for Table 2)

-continued

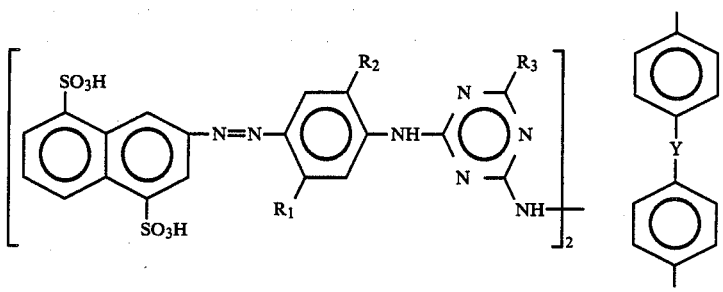

(for Table 3)

and are listed in the following Tables 2 and 3. With these dyestuffs cotton may be dyed in accordance with the dyeing method given in Application Examples A and B yielding yellow dyeings which exhibit good fastness properties. These fastness properties may be improved by after-treating the obtained dyeings according to the method of Application Examples C and D.

TABLE 2

| Ex. No. | $R_1$ | $R_2$ | $R_3$ |
|---|---|---|---|
| 34 | CH₃ | H | Cl |
| 35 | NHCOCH₃ | H | F |
| 36 | CH₃ | OCH₃ | Cl |
| 37 | " | H | —NHCH₂CHCH₂OH<br>                            \|<br>                           OH |
| 38 | NHCOCH₃ | H | " |
| 39 | " | H | —NHCH₂CH₂OH |
| 40 | " | H | —NHCH(CH₂OH)₂ |
| 41 | CH₃ | H | " |
| 42 | " | H | F |
| 43 | H | OCH₃ | Cl |
| 44 | CH₃ | H | —NH—⟨C₆H₄⟩—NHCOCH₃ |
| 45 | NHCOCH₃ | H | " |
| 46 | OCH₃ | OCH₃ | Cl |
| 47 | CH₃ | " | —NHCH₂CH₂OH |
| 48 | " | " | F |

TABLE 3

| Ex. No. | $R_1$ | $R_2$ | $R_3$ | Y |
|---|---|---|---|---|
| 49 | CH₃ | H | Cl | —NHCONH— |
| 50 | " | H | NH₂ | " |
| 51 | " | H | OH | " |
| 52 | " | H | —NHCH₂CH₂OH | " |
| 53 | NHCOCH₃ | H | " | " |
| 54 | " | H | Cl | " |
| 55 | " | H | —N(CH₂CH₂OH)₂ | " |
| 56 | " | H | —NH—⟨C₆H₄⟩—NHCOCH₃ | " |
| 57 | CH₃ | H | " | " |
| 58 | " | OCH₃ | Cl | " |
| 59 | " | " | F | " |
| 60 | NHCOCH₃ | H | —NHCH₂CHCH₂OH<br>                           \|<br>                          OH | " |
| 61 | NHCOCH₃ | H | —NHCH₂CH₂NH₂ | —NHCONH— |
| 62 | " | H | —NHCH₂CHNH₂<br>                       \|<br>                      CH₃ | " |
| 63 | " | H | —NHCH(CH₂OH)₂ | " |
| 64 | CH₃ | H | " | " |
| 65 | " | H | " | —NHCO— |
| 66 | NHCOCH₃ | H | " | " |
| 67 | " | H | Cl | " |
| 68 | CH₃ | H | Cl | " |
| 69 | " | H | —NHCH₂CH₂OH | " |
| 70 | NHCOCH₃ | H | —N(CH₂CH₂OH)₂ | " |
| 71 | " | H | —N(CH₂CH₂OH)₂ | " |
| 72 | CH₃ | H | " | " |
| 73 | " | OCH₃ | Cl | " |
| 74 | " | " | —NHCH₂CH₂OH | " |

TABLE 3-continued

| Ex. No. | $R_1$ | $R_2$ | $R_3$ | Y |
|---|---|---|---|---|
| 75 | " | $CH_3$ | " | " |

The dyestuffs of Examples 1 to 75 are obtained in sodium salt form. They may, depending on the reaction-/isolation conditions or by reacting the sodium salts in accordance with known methods, also be obtained in free acid form or in other salt forms, for example those salt forms indicated in the description hereinbefore.

According to the method given in Example 4, in the dyestuffs of Tables 1-3 containing chlorine or fluorine as radicals $R_3$ the halogen atom may be replaced partially by an amine radical depending on the amount of amine used. Direct dye mixtures are obtained which, depending on the amount and type of amine used for replacement, may show improved water solubility in connection with high affinity for the substrate.

What we claim is:

1. A compound of the formula

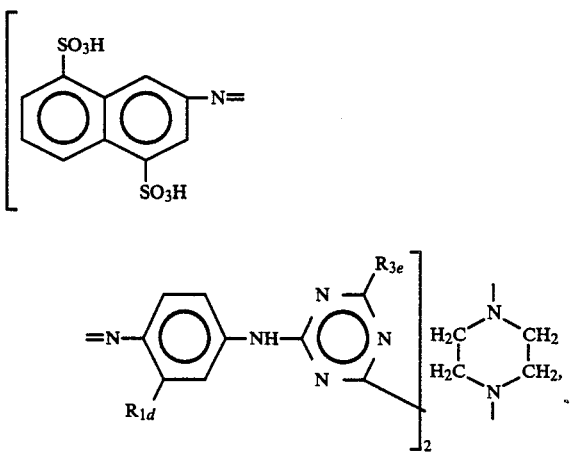

or a salt thereof each cation of which is non-chromophoric, wherein each $R_{1d}$ is acetamido or methyl, the two $R_{1d}$'s being identical, and each $R_{3e}$ is chloro or 2,3-dihydroxypropylamino, the two $R_{3e}$'s being identical.

2. The compound according to claim 1 having the formula

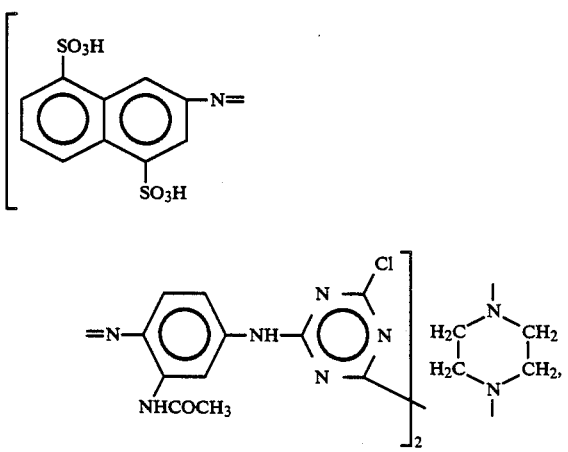

or a salt thereof each cation of which is non-chromophoric.

3. A sodium salt of the compound according to claim 2.

4. The compound according to claim 1 having the formula

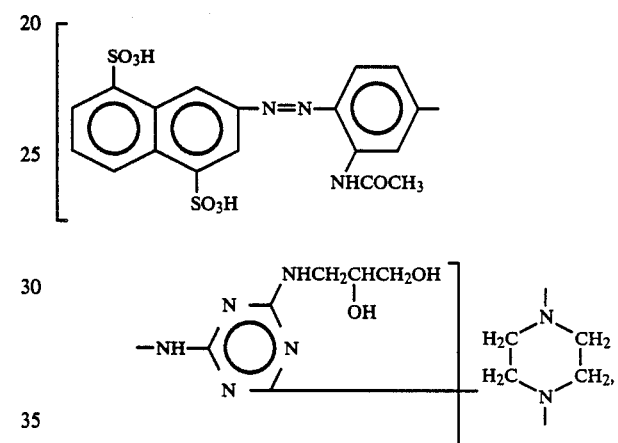

or a salt thereof each cation of which is non-chromophoric.

5. A sodium salt of the compound according to claim 4.

6. The compound according to claim 1 having the formula

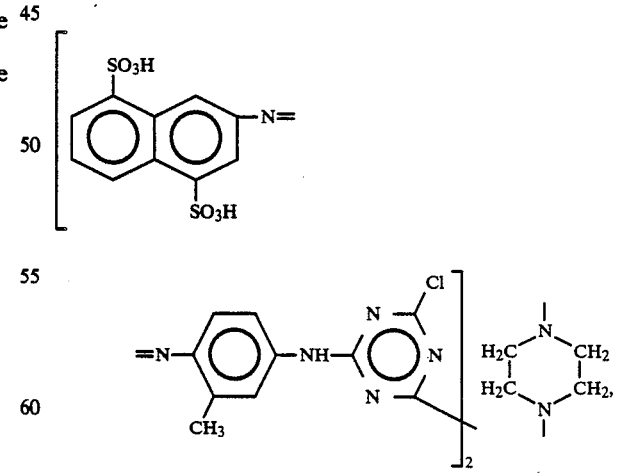

or a salt thereof each cation of which is non-chromophoric.

7. A sodium salt of the compound according to claim 6.

8. The compound of the formula

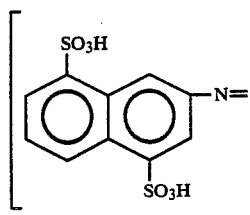
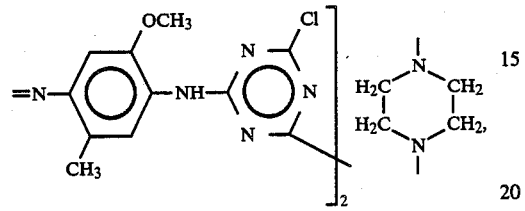
or a salt thereof each cation of which is non-chromophoric.
9. A sodium salt of the compound according to claim 8.
10. The compound according to claim 1 having the formula
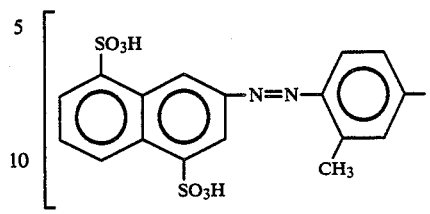
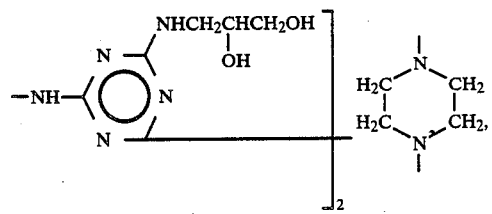
or a salt thereof each cation of which is non-chromophoric.
11. A sodium salt of the compound according to claim 10.
* * * * *